(12) United States Patent
Thanikachalam et al.

(10) Patent No.: US 10,475,392 B2
(45) Date of Patent: Nov. 12, 2019

(54) MEDIA ITEM RELIGHTING TECHNIQUE

(71) Applicant: ECOLE POLYTECHNIQUE FEDERALE DE LAUSANNE (EPFL), Lausanne (CH)

(72) Inventors: Niranjan Thanikachalam, Lausanne (CH); Loic Arnaud Baboulaz, Lausanne (CH); Damien Firmenich, Lausanne (CH); Sabine Suesstrunk, Lausanne (CH); Martin Vetterli, Grandvaux (CH)

(73) Assignee: ECOLE POLYTECHNIQUE FEDERALE DE LAUSANNE (EPFL), Lausanne (CH)

( * ) Notice: Subject to any disclaimer, the term of this patent is extended or adjusted under 35 U.S.C. 154(b) by 462 days.

(21) Appl. No.: 15/063,373

(22) Filed: Mar. 7, 2016

(65) Prior Publication Data
US 2017/0256208 A1 Sep. 7, 2017

(51) Int. Cl.
*G09G 3/34* (2006.01)
*G09G 5/10* (2006.01)

(52) U.S. Cl.
CPC ............ *G09G 3/3406* (2013.01); *G09G 5/10* (2013.01); *G06T 2207/10152* (2013.01); *G06T 2207/20048* (2013.01); *G09G 2360/144* (2013.01)

(58) Field of Classification Search
USPC ........................................................ 345/426
See application file for complete search history.

(56) References Cited

U.S. PATENT DOCUMENTS 8,928,734 B2 * 1/2015 Dai ...................... G06T 7/0073
345/420
9,001,226 B1 * 4/2015 Ng ..................... H04N 5/23203
348/211.11
(Continued)

OTHER PUBLICATIONS

T. Malzbender, D. Gelb, and H. Wolters, "Polynomial texture maps," in In Computer Graphics, SIGGRAPH 2001 Proceedings, 2001, pp. 519-528.
(Continued)

*Primary Examiner* — Kimbinh T Nguyen
(74) *Attorney, Agent, or Firm* — Mu P.C.

(57) ABSTRACT

The present invention concerns a method of method of relighting a media item comprising media elements. The method comprises, for at least some of the media elements: determining, in a first signal domain, a light transport function describing the appearance of a particular media element under different illumination conditions at least partly defined by positions of a light source used to illuminate the particular media element; sampling, in the first signal domain, the light transport function of the particular media element to obtain discrete data samples of the light transport function; projecting the data samples in the first signal domain into a sampling grid to obtain spatially sparsely and non-uniformly sampled light transport function; interpolating, in a second signal domain, the sparsely and non-uniformly sampled light transport function to obtain an approximate light transport matrix in the second signal domain; converting the approximate light transport matrix into the first signal domain to obtain an approximate substantially uniformly sampled light transport function in the first signal domain; and using, in the first signal domain, the approximate substantially uniformly light transport function to relight the media item.

16 Claims, 4 Drawing Sheets

(56) References Cited

U.S. PATENT DOCUMENTS

| | | | | |
|---|---|---|---|---|
| 2006/0209067 | A1* | 9/2006 | Pellacini | G06T 15/50 345/426 |
| 2007/0285422 | A1* | 12/2007 | Nayar | G06K 9/4661 345/426 |
| 2010/0194862 | A1* | 8/2010 | Givon | G03H 1/268 348/49 |
| 2011/0285822 | A1* | 11/2011 | Dai | G06T 7/586 348/46 |
| 2011/0304745 | A1* | 12/2011 | Wang | G06T 15/50 348/229.1 |
| 2012/0294543 | A1* | 11/2012 | Sen | H04N 19/63 382/233 |
| 2013/0044213 | A1* | 2/2013 | Kirmani | G01J 1/0437 348/135 |
| 2013/0088726 | A1* | 4/2013 | Goyal | G01S 7/4866 356/634 |
| 2014/0285625 | A1* | 9/2014 | McGarry | G01C 11/025 348/46 |
| 2017/0060089 | A1* | 3/2017 | Tsang | G03H 1/0808 |

OTHER PUBLICATIONS

P. Ren, J. Wang, J. Snyder, X. Tong, and B. Guo, "Pocket reectometry," ACM Trans. Graph., vol. 30, No. 4, pp. 45:1-45:10, Jul. 2011. [Online]. Available: http://doi.acm.org/10.1145/2010324.1964940.

V. Masselus, P. Dutre, and F. Anrys, "The free-form light stage," in Proceedings of the 13th Eurographics Workshop on Ren-dering, ser. EGRW '02. Aire-la-Ville, Switzerland, Switzerland: Eurographics Association, 2002, pp. 247-256. [Online]. Available: http://dl.acm.org/citation.cfm?id=581896.581928.

A. Davis, M. Levoy, and F. Durand, "Unstructured light elds," Comp. Graph. Forum, vol. 31, No. 2pt1, pp. 305-314, May 2012. [Online]. Available: http://dx.doi.org/10.1111/j.1467-8659.2012.03009.x.

D. Donatsch, S. A. Bigdeli, P. Robert, and M. Zwicker, "Hand-held 3d light eld photography and applications," Vis. Comput., vol. 30, No. 6-8, pp. 897-907, Jun. 2014. [Online]. Available: http://dx.doi.org/10.1007/s00371-014-0979-5.

M. Fuchs, V. Blanz, H. P. Lensch, and H.-P. Seidel, "Adaptive sampling of reectance elds," ACM Trans. Graph., vol. 26, No. 2, Jun. 2007. [Online]. Available: http://doi.acm.org/10.1145/1243980.1243984.

D. L. Donoho, "Compressed sensing," IEEE Trans. Inform. Theory, vol. 52, pp. 1289-1306, 2006.

P. Peers, D. K. Mahajan, B. Lamond, A. Ghosh, W. Matusik, R. Ra-mamoorthi, and P. Debevec, "Compressive light transport sensing," ACM Trans. Graph., vol. 28, No. 1, Feb. 2009.

B. Tunwattanapong, G. Fye, P. Graham, J. Busch, X. Yu, A. Ghosh, and P. Debevec, "Acquiring reectance and shape from continuous spherical harmonic illumination," ACM Trans. Graph., vol. 32, No. 4, pp. 109:1-109:12, Jul. 2013. [Online]. Available: http://doi.acm.org/10.1145/2461912.2461944.

T. Hawkins, J. Cohen, and P. Debevec, "A photometric approach to digi-tizing cultural artifacts," in Proceedings of the 2001 conference on Virtual reality, archeology, and cultural heritage, ser. VAST '01, 2001.

P. Debevec, A. Wenger, C. Tchou, A. Gardner, J. Waese, and T. Hawkins, "A lighting reproduction approach to live-action compositing," ACM Trans. Graph., vol. 21, 2002.

P. Debevec, T. Hawkins, C. Tchou, H.-P. Duiker, W. Sarokin, and M. Sagar, "Acquiring the reectance eld of a human face," in Proceedings of the 27th annual conference on Computer graphics and interactive techniques, ser. SIGGRAPH '00, 2000.

M. O'Toole and K. N. Kutulakos, "Optical computing for fast light trans-port analysis," ACM Trans. Graph., 2010.

* cited by examiner

MEDIA ITEM RELIGHTING TECHNIQUE

TECHNICAL FIELD

The present invention relates to a method of relighting a media item, such as a photograph. The invention also relates to a corresponding media item processing apparatus for carrying out the method, and to a computer program product.

BACKGROUND OF THE INVENTION

Advances in computational photography have enabled richer visualizations of digitized real world scenes, when compared with traditional media items, such as photographs. Relightable media items, referred to here as photographs, are one such technique that can supplement the visual experience provided by a conventional digital photograph. This technology allows users to interact with a photograph by changing the incident illumination of the scene, or alternatively allows the photograph to adapt according to the current illumination scenario in the environment where the photograph is displayed. Relightable photographs are thus alternatives to traditional photographs, as they provide a richer viewing experience.

More than a decade ago, the lighting-sensitive display was first proposed as a medium for displaying photographs that respond to the viewing environment by dynamically changing their incident illumination. Such relightable photographs are created by acquiring the scene's reflected field, so that the scene can be rendered under novel illumination conditions. Acquiring the reflectance function of a real-world scene is called inverse rendering, and a large number of acquisition frameworks focus on fast and accurate acquisition of the reflectance function. However, the complexity and the scale of most of the existing acquisition frameworks prevent widescale use beyond specialized studios.

The two existing frameworks for scene relighting involve either acquiring the parametric form of per-pixel reflectance functions or through image based relighting. Object relighting tries to recreate the appearance of a pictured scene or object under new illumination. Several acquisition setups that involve complex light stages with fixed or movable light sources mounted on robotic arms exist and thus are limited in their accessibility. Polynomial texture mapping is a technique that uses a glossy black sphere to determine the illumination angle, and models per-pixel reflectance using biquadratic polynomials. Pocket reflectometry is a second portable method where a reference bidirectional reflective distribution function (BRDF) chart is used in combination with a handheld light source to acquire parametric surface reflectance.

It is an object of the present invention to overcome the problems related to the existing techniques for relighting a media item and thus to provide a media item relighting solution which is simple, yet reliable and efficient, and which is easily accessible to a large number of users.

SUMMARY OF THE INVENTION

According to a first aspect of the invention, there is provided a method of relighting a media item as recited in claim 1.

The proposed new solution has the advantage that it provides a simple and easily available technique for media item relighting. For example, the proposed solution does not require the computation of surface normals or 3D geometry of the scene for instance. The proposed solution is also intuitive, fast and non-restrictive in terms of possible viewing configurations. Thus, a novel and practical handheld system for the creation of relightable photographs is proposed.

According to a second aspect of the invention, there is provided a computer program product comprising instructions for implementing the steps of the method when loaded and run on computing means of an electronic device.

According to a third aspect of the invention, there is provided a media item processing apparatus for relighting a media item.

An image rendering device may comprise the media item processing apparatus.

Other aspects of the invention are recited in the dependent claims attached hereto.

BRIEF DESCRIPTION OF THE DRAWINGS

Other features and advantages of the invention will become apparent from the following description of a non-limiting exemplary embodiment, with reference to the appended drawings, in which.

DETAILED DESCRIPTION OF AN EMBODIMENT OF THE INVENTION

Figure 1:
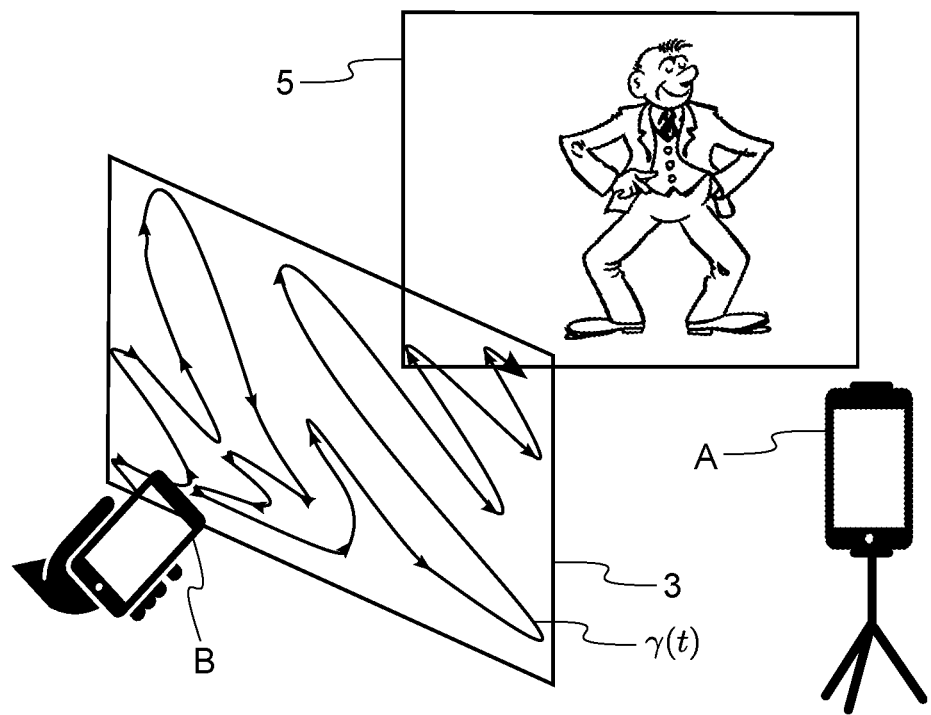
FIG. 1 shows a setup for obtaining a light transport function of a scene according to an example of the present invention.

An embodiment of the present invention will now be described in detail with reference to the attached figures. This embodiment is described in the context of relightable two-dimensional (2D) photographs, but the teachings of the invention are not limited to this environment. The teachings of the invention are also applicable to other types of media items, such as 3D photographs or videos. Identical or corresponding functional and structural elements which appear in the different drawings are assigned the same reference numerals.

The present invention provides a new framework for handheld acquisition and reconstruction of scene reflectance. Unlike existing setups, the proposed acquisition setup does not require any special equipment apart from two imaging apparatuses, which can be handheld devices, such as now ubiquitous smartphones. In the described embodiment, two mobile phones A and B are used, where the mobile phone A may be stationary and is used to record a video, i.e. a stack of images, of the scene. The user simultaneously uses the mobile phone B to illuminate the scene by moving it for example along a random trajectory while pointing its camera flash at the scene. A custom designed smartphone application running on the mobile phone B uses a simultaneous localization and mapping algorithm, such as parallel tracking and mapping (PTAM), to track the light source (camera flash) position in 3D space. The proposed reconstruction algorithm uses the video from the mobile phone A, and the estimated 3D positions from the mobile phone B, to compute per-pixel reflectances as explained later in more detail. In this way, an image-based rendering approach is devised for creating relightable photographs. A compressive sensing based reconstruction algorithm is presented to acquire the light transport matrix of the scene from irregularly sampled data. The light transport matrix is then used to render the scene under novel illumination configurations, thus allowing the users to interact with the scene. A light transport matrix can be defined to be an array of sub-arrays, where each sub-array represents a light transport function for a particular pixel or media item element.

The proposed approach for creating relightable photographs includes acquiring the light transport field $\mathcal{T}(r,s)$ between a sensor plane 1, also referred to as an image plane, of a camera of the mobile phone A, defined by $s=[s_1,s_2]$ and an illumination plane 3—a bounded rectangle defined in the region in which the user moves the mobile phone B, defined by $r=[r_1,r_2]$. Without loss of generality, the image plane is defined to coincide with the focal plane of the camera. As the camera projects this plane to its image plane (e.g. sensor or film), this plane is referred to as the image plane.

A light transport field describes an object's appearance under different illumination conditions. First the proposed acquisition system is described, then the non-uniform sampling model of the acquisition stage and finally the reconstruction algorithm are described.

FIG. 1 illustrates the acquisition system or setup. In this example, the mobile phone A is placed in a stationary position facing the object so that the object of interest 5, also referred to as a scene, is in the field of view of its camera. During the acquisition stage, its camera is turned on and captures images continuously. At the same time, the user holds the mobile phone B, which also has its camera active, and is directed towards the scene such that the scene is included in the image displayed on the mobile phone B, and marks the object of interest 5 on its display. A bounding box corresponding to the illumination plane to be sampled is shown to the user on the display of the mobile phone A. The user of the mobile phone B now starts randomly scribbling on the illumination plane by moving the mobile B with its light source on, for example with its camera flash continuously illuminated, inside the bounding box (or close to it) displayed in the mobile phone B. A synchronization signal sent to the mobile phone A starts recording a video on the camera of the mobile phone A. The trajectory γ(t) that the user takes with the mobile phone B is tracked by the PTAM algorithm and is displayed on the bounding box in real-time. The user continues until he has scribbled in all regions of the bounding box. In this example, the mobile phone A outputs a video to a computing device, such as a computer, each frame of the video corresponding to a captured image. The mobile phone B outputs to the same computing device the set of co-ordinates corresponding to the location of the light source on the illumination plane for each frame of the video. The computing device is then arranged to carry out the operations and computations explained below. It is to be noted that the computing device could also comprise one of the mobile phones A, B.

In this manner, the user of the mobile phone B has scanned the scene 5 in order to obtain, as explained later in detail, a slice of the reflectance or light transport function by moving the mobile phone B, with its flash on, in a random trajectory γ(t) along the illumination plane 3. It is to be noted that the pixel reflectance property is generally referred to as the reflectance function when operating in spherical coordinates, but referred to as the light transport function when operating in Cartesian coordinates. In the example embodiment, Cartesian coordinates are used. It is further to be noted that only a slice of the light transport function can be acquired because the size of the illumination plane is not infinite. Thus, acquiring the whole light transport function for a pixel would require the illumination plane 3 to have an infinite size, which is not possible in practice.

Figure 2:
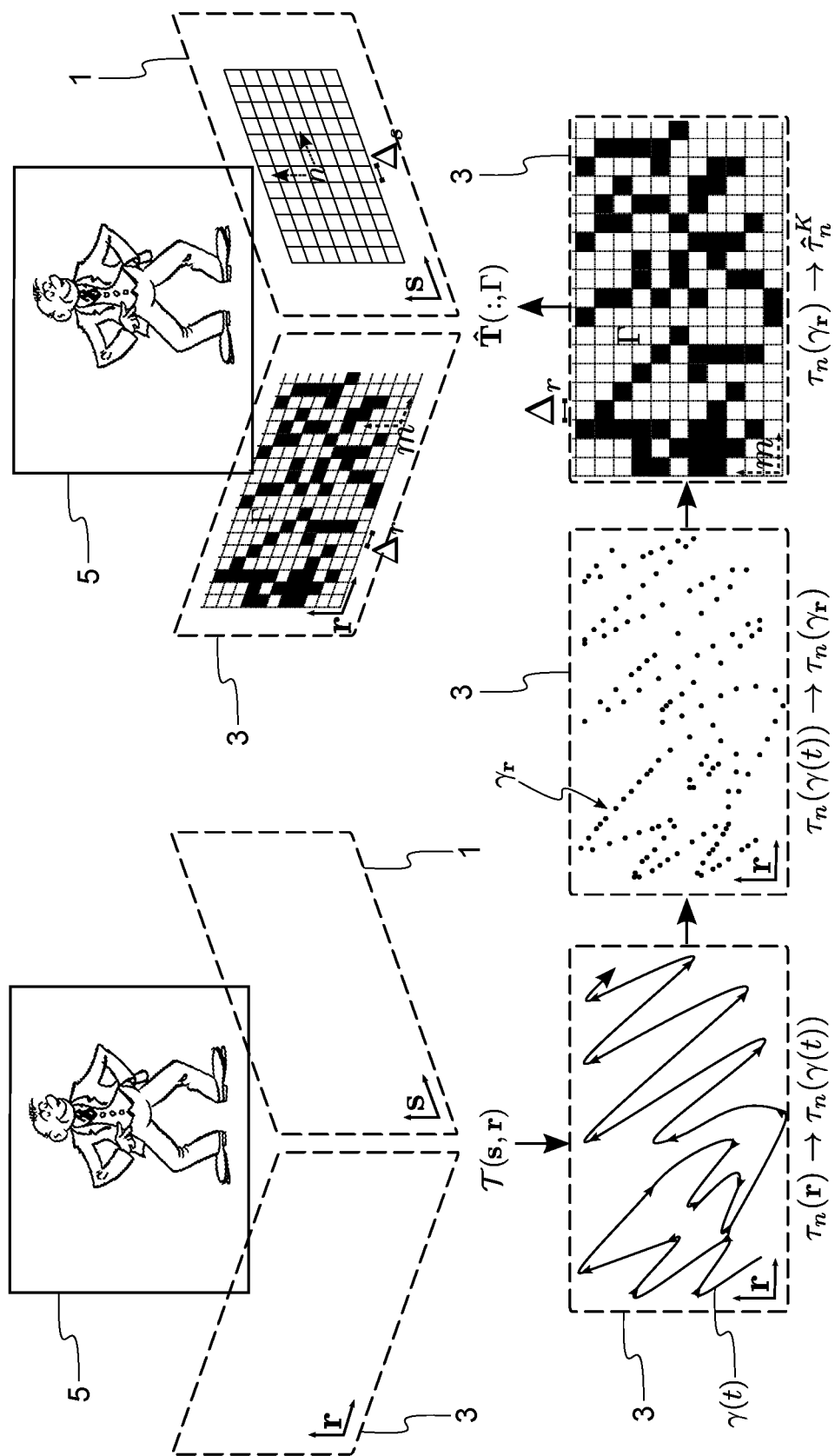
FIG. 2 illustrates the process of performing non-uniform sampling in order to obtain a non-uniformly sampled light transport function according to an example of the present invention.

The light transport function acquisition process can be described using the following sampling model, with reference to FIG. 2. Without loss of generality, the sampling period on r along both $r_x$ and $r_y$ is $\Delta r$, while the sampling period on s along both $s_x$ and $s_y$ is $\Delta s$. The spatially invariant sampling kernel is $\phi_r$ and $\phi_s$ on the illumination plane 3 and the image plane 1 respectively. Thus, T(s,r) after sampling at the image plane 1 is $$\tau_n(r) = T(n, r) = \left\langle T(s, r), \phi_s\left(\frac{s}{\Delta_s} - n\right)\right\rangle \quad (1)$$

$$n \in [0 \ldots N - 1].$$

Here, $\mathcal{T}(n,r)$ is an ensemble of N continuous space 2D signals $\tau_n(r)$. N is the camera sensor size, i.e. the number of image pixels. Here $\tau_n(r)$ is referred to as the nth continuous space light transport function (LTF), where n is a media item index, in this example a pixel index of the image. When $r \in \mathbb{R}^2$ (infinitely long illumination plane), each $\tau_n(r)$ corresponds to the complete reflectance function of the surface point corresponding to the nth pixel. Equation 1 thus discretizes the image plane 1 using the mobile phone A. As a result, the light transport function $\tau_n(r)$ can be observed at each pixel n. At this stage the illumination plane 3 is still continuous, i.e. it has not yet been discretized.

The mobile phone B automatically carries out the sampling operation of the spatially varying light transport function $\tau_n(\gamma(t))$ by moving the light source along the trajectory γ(t) as a function of time. The trajectory taken by the mobile phone B is simultaneously discretized by the acquisition system at a sampling rate $\Delta_t$ determined by the PTAM and the frame rate of the camera of the mobile phone A. Also, since the user might move the mobile phone B at a varying velocity, γ(t) is also non-uniformly sampled in the spatial domain. Thus, one only has access to samples along a discrete trajectory $\gamma_r$ defined on r. In this example, the trajectory samples are distributed uniformly and randomly across the desired illumination plane 3. At the end of the acquisition, an ensemble of light transport functions is obtained, sampled along a discrete trajectory, such that $$\tau_n(\gamma_r) = \left\langle \mathcal{T}(s, \gamma_r), \phi_s\left(\frac{s}{\Delta_s} - n\right)\right\rangle. \quad (2)$$

Thus, on the illumination plane 3, at this moment, there are only discrete samples along $\gamma_r$. Thus, at this stage a non-uniformly sampled light transport function $\tau_n(\gamma_r)$ is obtained, preferably for each pixel.

Next $\tau_n(\gamma_r)$ is resampled by projecting the discrete trajectory $\gamma_r$ into the desired sampling grid or sampling lattice of the illumination plane 3 defined by $r \in \mathbb{R}^2$ and $\Delta r$ to obtain Γ, an indicator function; Γ describes the set of K<M elements of the sampling grid that were traversed by the discrete trajectory. M is the total number of grid elements and it is determined by $\Delta r$, while K is the total number of observed samples (black boxes or elements in FIG. 2). M may be a user-defined parameter or it may be obtained by a heuristic process. The overall projection process can now be summarized as follows;

$$\hat{\tau}_n^K \left\{ \tau_n(\gamma_r), \phi_r \left( \frac{r}{\Delta_r} - m \right) \right\} \quad (3)$$

$m=[0, \ldots M-1]$ & $n=[0, \ldots N-1]$, where m is the index of the sampling grid, and $\hat{\tau}_n^K$ denotes the projection of $\tau_n(\gamma_r)$ into the chosen discrete illumination plane. Each pixel n on the camera of the mobile phone A has thus observed a sparse set of samples of its light transport function along $\Gamma$. Now, a sparsely and non-uniformly sampled light transport matrix $\hat{T}(:,\Gamma)$ has been obtained consisting of $\hat{t}_n^K$. For brevity, T(n,m) (ideal light transport matrix) is denoted by T and $\hat{T}(n,\Gamma)$ by $\hat{T}(:,\Gamma)$. The goal of the reconstruction framework is thus to find an approximation of T from $\hat{T}(:,\Gamma)$.

The objective is next to obtain a light transport function $\hat{\tau}_n \in \mathbb{R}^M$ that approximates $\tau_n$ from K random linear observations $\hat{\tau}_n^K \in \mathbb{R}^K$. It is to be noted that one has information on neither the structure of the frequency spectrum of individual light transport functions, $\tau_n$, nor the bandwidth of these functions. Let $f_n$ denote the discrete Fourier transform of $\tau_n$ such that $$f_n = \psi \tau_n, \quad (4)$$

where $\psi$ is the transform matrix. If $f_n$ or its approximation $\hat{f}_n$ can be recovered, the light transport function can be reconstructed by the inverse transform $$\hat{\tau}_n = \psi^T \hat{f}_n. \quad (5)$$

If $f_n$ is now approximated by its V largest entries, the best projection of $\tau_n$ is recovered into the subspace of M dimensional functions with a frequency support of V. Thus, the objective can be modified to recover the V largest coefficients of $f_n$ by solving for $$\tilde{f}_n = \arg\min \|f_n\|_1 \text{ subject to } \hat{\tau}_n^K = \psi_K^T f_n, \quad (6)$$

where $\psi_K = (:,\Gamma)$. When $f_n$ is V-sparse, it can be recovered exactly. When $f_n$ is not sparse, but is compressible, the solution is such that $\|f_n - \tilde{f}_n\|_2$ is upper bounded, i.e. the error between $f_n$ and $\tilde{f}_n$ is minimized. Thus, Equation 6 performs interpolation in the frequency domain using a compressive sensing formulation. Once this is done, the approximated frequency domain representation of the light transport function is transferred back to the spatial domain (for every pixel in this example) to obtain an approximated uniformly sampled light transport matrix $\hat{T}(n,m)$. It is to be noted that that the above transformation can be done in another transform domain than that of the frequency domain. Any spatial domain signal or function can be converted from the spatial domain to a transform domain and vice-versa, using a pair of mathematical operators called the 'transform' and the 'inverse transform'. Examples of such transforms include the Fourier transform, the discrete cosine transform and the wavelet transform.

Figure 3:
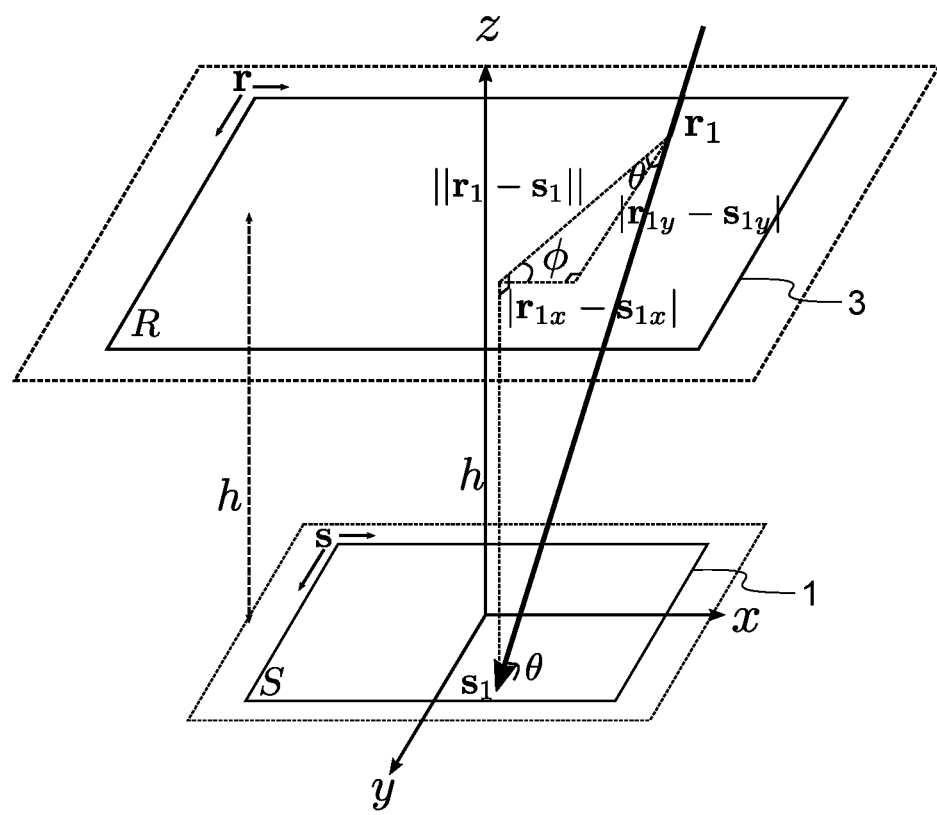
FIG. 3 shows a parametrization of an illumination plane and an image plane for continuous space light transport according to an example of the present invention.

Let us now consider the case, where the illumination plane 3 is parallel to the image plane 1 and is located at a distance h from the scene as shown in FIG. 3. FIG. 3 illustrates the configuration when performing the relighting procedure for a directional light source $(\theta, \phi)$. Here the image plane 1 represents the scene 5. Let R denote a rectangle on the illumination plane 3, inside which point light sources can be continuously located while S is a rectangle on the image plane 1 corresponding to the camera sensor. Thus for a scene with convex surface geometry (or for other surface geometries too but with slightly less precision), any surface point $s \in S$ can be rendered under incident illumination angles $\theta_i, \phi_i$ given by, $$\theta_i = \arccos \frac{h}{\|r - s\|}, \phi_i = \arctan \frac{r_y - s_y}{r_x - s_x}, \text{ where, } r \in R. \quad (7)$$

With T(s,r) the scene can be relit as if lit by a directional light source along any incident direction that exists inside the solid angle $\Omega_{(R,h)}$, by choosing the incident rays such that equation (7) is satisfied (FIG. 3). In other words, during relighting, if the incident light is specified as a directional light characterized by $\theta$ and $\phi$, then for each point s in the image plane 1, Equation 7 can be used to find the value of r where the light ray intersects the illumination plane 3. Given the coordinate of r for each point s, the index m can be determined for each pixel n. Finally, the appearance of pixel n under the required direction is given by $\hat{T}(n,m)$.

Figure 4:
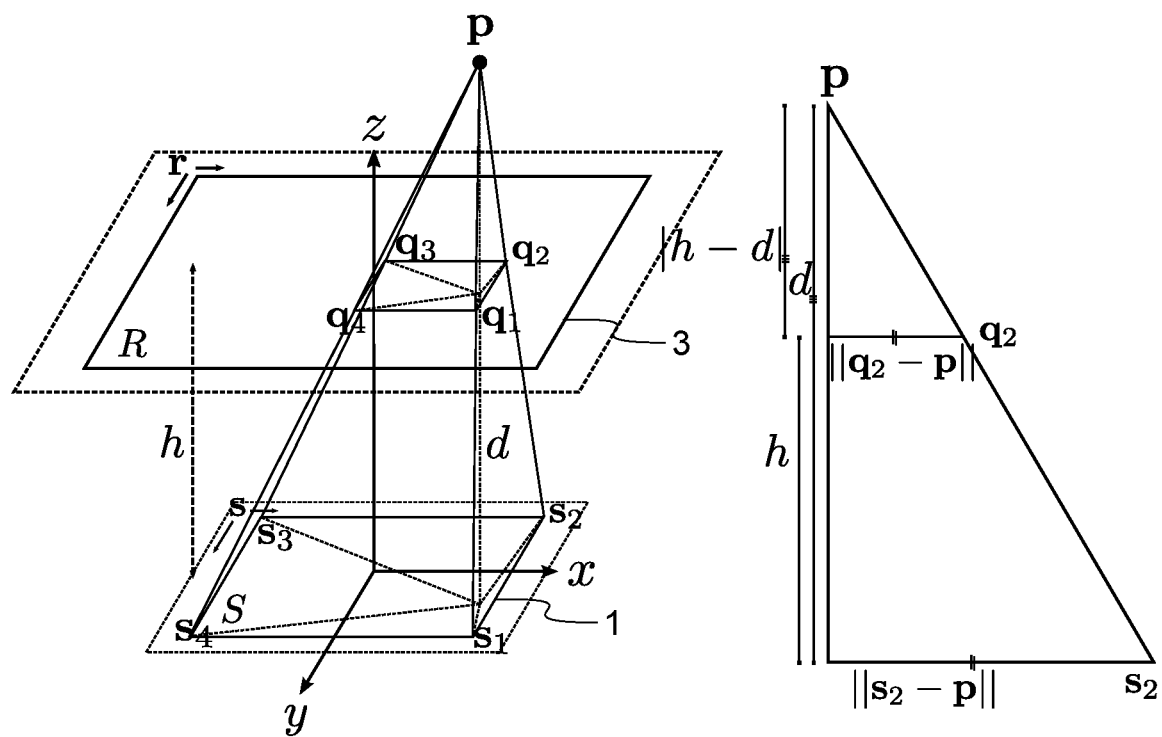
FIG. 4 illustrates the geometry of a situation where a light source is located away from the illumination plane according to an example of the present invention.

Alternatively, the scene can be relit with a point light source located above or below the illumination plane defined by r, by choosing incident light rays such that they converge at the location of the desired point light source, as shown in FIG. 4. FIG. 4 illustrates the geometry when rendering with a point light source at a novel location, given the continuous space light transport. Again, the image plane 1 is overlaid on the scene 5 for ease of illustration. Since a point light source (isotropic source) is used, each surface point $s \in S$ has been observed for the entire range of incident angles subtended by the rectangle R in the illumination plane 3. Given S and a point source p located at a distance d from the image plane 1, the incident rays intersect the illumination plane forming a rectangle defined by the points $q_i$ given by the equation $$\frac{\|s_i - p\|}{d} = \frac{\|q_i - p\|}{|d - h|}, i \in [1, 2, 3, 4]. \quad (8)$$

In other words, during relighting, if the incident light is specified as a point light p located above or below the illumination plane, then Equation 8 can be used to determine the rectangle (defined by the points $q_i$) where the incident light rays intersect with the illumination plane 3. Thus, the coordinate of r is computed for each point s, from which the index m can be determined for each pixel n. Finally, the appearance of pixel n under the required light is given by $\hat{T}(n,m)$.

Given the light transport matrix T(m,n) or its approximate $\hat{T}(n,m)$, the scene 5 can be described under any combination of point light sources in the illumination plane 3, using the image formation equation:

$$y = Tl, \quad (9)$$

where $y \in \mathbb{R}^{N \times 1}$ is the observed (vectorized) image or object more generally, and $l \in \mathbb{R}^{M \times 1}$ is the (vectorized) illumination configuration. Thus l describes the intensities and distribution of light sources in the illumination plane 3, or more specifically, it may describe the discretized illumination plane by representing the intensity of various point light sources. Once a light transport matrix T, or more specifically $\hat{T}$, has been obtained, the scene 5 can be relit arbitrarily. Due to the superposition property of light, even if there is more than one light source, the appearance of the scene 5 can be computed under the illumination configuration 1 using the image formation equation above (Equation 9). If the light source is located outside the illumination plane (above or below it), Equation 9 can also be used to compute the appearance of the scene 5.

The scene 5 can be relit under point light sources in planes away from the illumination plane by choosing incident directions that converge at the point light source in space using the same method described in the continuous case. As a result of sampling and interpolation, the light transport functions $\tau_n$ are now projected to a bandlimited subspace. Thus, hard shadows are projected as soft shadows, while mirror-like or specular regions are projected as glossy surfaces.

Figure 5:
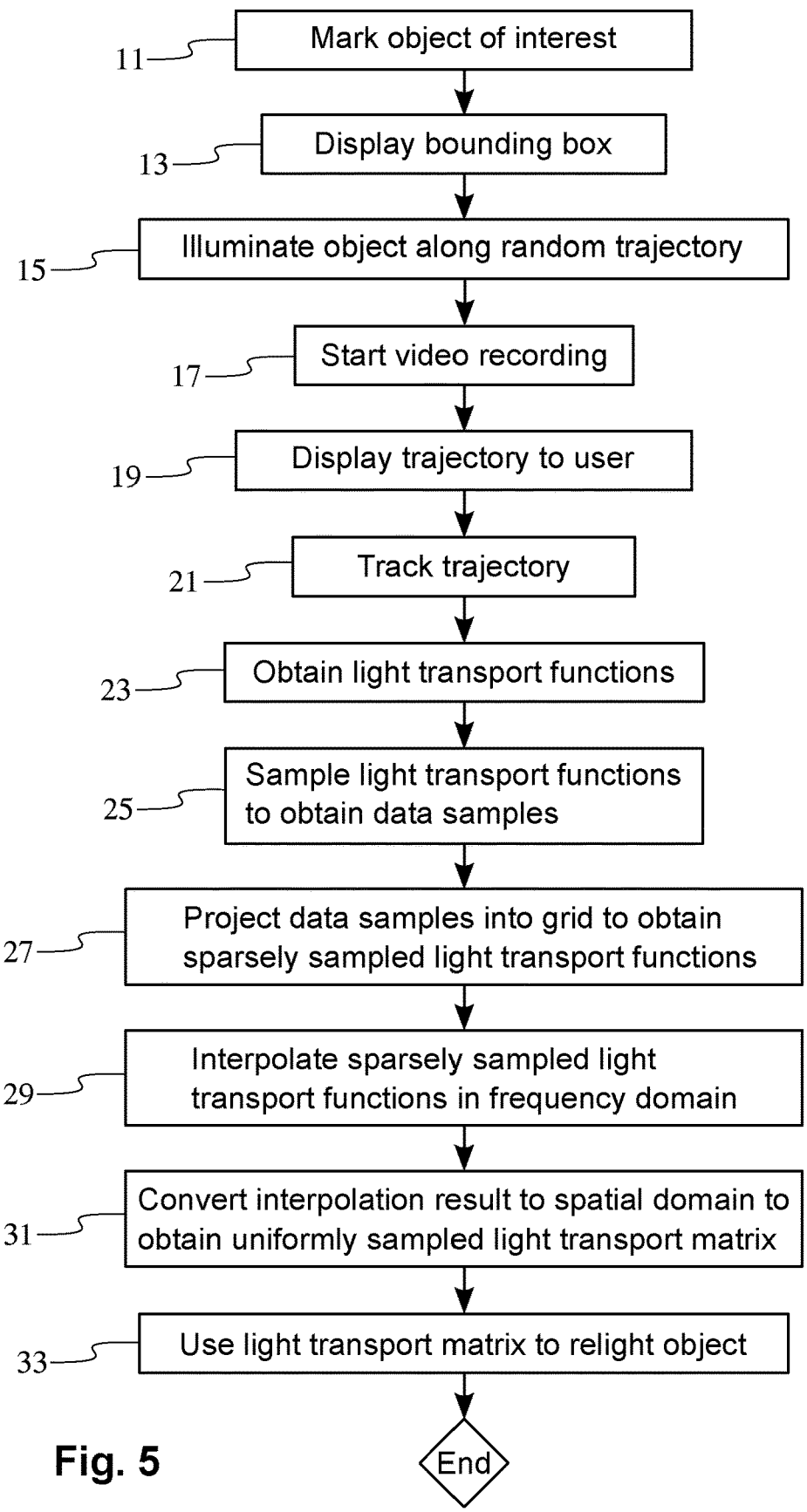
FIG. 5 is a flow chart illustrating the relighting technique according to an example of the present invention.

The flow chart of FIG. 5 summarizes the above described object relighting method according to an example. Once the mobile phone A is in place, in step 11, the user of the mobile phone B marks the scene 5 by selecting it on the phone display for example. In step 13, a bounding box of the scene 5 is displayed to the user of the phone B on the display of the mobile phone B. In step 15 the user of the mobile phone B starts to illuminate the scene 5 with the light source of the mobile phone B and moves the mobile phone B along a random trajectory or path, thereby illuminating the scene. Once the user of the mobile phone B starts the illumination process, the mobile phone B sends a synchronization signal to the mobile phone A. In step 17, in response to the synchronization signal received from the mobile phone B, the mobile phone A starts to record a video of the scene 5. Simultaneously with the illumination of the scene 5 along the trajectory, in step 19, the mobile phone B gradually displays, substantially in real time, the progress of the trajectory. In step 21, the mobile phone B tracks the path of the trajectory as the trajectory progresses. Steps 15, 17, 19 and 21 may take place substantially at the same time.

In step 23, in the spatial domain continuous light transport field $\mathcal{T}(\gamma(t))$ comprising continuous light transport functions $\tau_n(\gamma(t))$ is obtained by mapping each frame of the video (recorded by the mobile phone A) with the position of the light source when recoding a particular frame. This light transport field thus only describes the appearance of the scene or each pixel of the scene when illuminated along the trajectory. However, this light transport field does not describe how the scene 5 appears when illuminated from positions outside the trajectory. In step 25, the trajectory is discretized to obtain the light transport field sampled along the discrete trajectory $\gamma_r$. In other words, the pixel-specific non-uniformly sampled light transport functions $\tau_n(\gamma_r)$ are obtained by forming the non-uniformly sampled light transport field. Step 25 may be automatically carried out by the PTAM algorithm. Thus, after step 25, in the spatial domain non-uniformly sampled light transport field $\mathcal{T}(\gamma_r)$ is obtained. In step 27, in this example for all the pixels independently from each other, the data samples of the non-uniformly sampled light transport functions are mapped to the sampling lattice of the illumination plane 3 to obtain in the spatial domain sparsely and non-uniformly sampled light transport functions $\hat{\tau}_n^K$ forming the sparsely sampled light transport matrix $\hat{T}(:,\Gamma)$.

In step 29, the sparsely sampled light transport matrix $\hat{T}(:,\Gamma)$, or more specifically the sparsely sampled light transport functions $\hat{\tau}_n^K$ are interpolated in the frequency domain, in this example by using the compressive sensing formulation of Equation 6. In this manner an approximated light transport matrix in the frequency domain is obtained. The interpolation is done in the transform domain, in this example in the frequency domain, because in the transform domain the signal to be interpolated comprises fewer coefficients than in the spatial domain. In step 31, the approximated light transport matrix in the frequency domain is converted into the spatial domain to obtain the approximate uniformly sampled light transport matrix $\hat{T}$. In step 33 the obtained approximate uniformly sampled light transport matrix $\hat{T}$ is used for example in Equation 9 to obtain the relit scheme 5. The relit scheme can be displayed to the user, for example on a display.

While the invention has been illustrated and described in detail in the drawings and foregoing description, such illustration and description are to be considered illustrative or exemplary and not restrictive, the invention being not limited to the disclosed embodiment. Other embodiments and variants are understood, and can be achieved by those skilled in the art when carrying out the claimed invention, based on a study of the drawings, the disclosure and the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method of relighting a media item comprising media elements, the method comprising, for at least some of the media elements:

a first mobile computing device illuminating at least a portion of the media item by a light source of the first mobile computing device;

the first mobile computing device sending a synchronization signal to a second mobile computing device to instruct the second mobile computing device to record a video of the at least a portion of the media item;

the first mobile computing device moving along a random trajectory at a varying velocity to thereby illuminate the at least a portion of the media item by the light source;

the first mobile computing device tracking the trajectory;

the first mobile computing device receiving media item frames of the media item recorded by the second mobile computing device;

the first mobile computing device determining a position of the light source for at least some of the media item frames for obtaining a light transport function;

the first mobile computing device determining, without using 3D geometry of the media item in the determination, the light transport function, in a first signal domain, describing the appearance of a particular media element under different illumination conditions at least partly defined by positions of the light source used to illuminate the particular media element;

the first mobile computing device sampling in the first signal domain the light transport function of the particular media element to obtain discrete data samples of the light transport function;

the first mobile computing device projecting the data samples, in the first signal domain, into a sampling grid to obtain a spatially sparsely and non-uniformly sampled light transport function;

the first mobile computing device converting the spatially sparsely and non-uniformly sampled light transport function into a transform signal domain referred to as a second signal domain by using a mathematical operation;

the first mobile device interpolating in the second signal domain, by performing compressive sensing of the sparsely and non-uniformly sampled light transport function to obtain a light transport matrix in the second signal domain; and the first mobile computing device transforming the light transport matrix from the second signal domain into the first signal domain to obtain a substantially uniformly sampled light transport matrix to produce a relighted media item suitable to be displayed on a display.

2. The method according to claim 1, wherein the light source moves in a plane.

3. The method according to claim 1, wherein the light source moves within an illumination region, and the movement within the illumination region is random.

4. The method according to claim 1, wherein the first domain is a spatial domain, and the second domain is a frequency domain.

5. The method according to claim 1, wherein the different illumination conditions are also at least partly defined by a light source intensity value in a particular light source position.

6. The method according to claim 1, wherein the media item is an image or a video.

7. The method according to claim 1, wherein the media element is a pixel or a voxel.

8. The method according to claim 1, wherein the second mobile computing device is stationary.

9. The method according to claim 1, wherein the first and second mobile computing devices are handheld electronic devices.

10. The method according to claim 1, wherein the tracking is carried out by a parallel tracking and mapping algorithm.

11. The method according to claim 1, wherein the method further comprises the first mobile computing device gradually displaying the trajectory while the light source moves along the trajectory.

12. The method according to claim 1, wherein the method further comprises a user of the first mobile computing device selecting the media item by the first mobile computing device.

13. The method according to claim 12, wherein the method further comprises, in response to the selection, the first mobile computing device indicates a region comprising the media item to be illuminated by the light source of the first mobile computing device.

14. The method according to claim 1, wherein the method further comprises using, in the first signal domain, the substantially uniformly sampled light transport matrix to relight the media item.

15. A non-transitory, computer-readable, programmable product, for use in conjunction with a computing device, comprising code, executable by the computing device, for causing the computing device to do the following:

illuminate at least a portion of the media item by a light source of the computing device;

send a synchronization signal to another computing device to instruct the other computing device to record a video of the at least a portion of the media item;

track a random and varying velocity trajectory of the computing device;

receive media item frames of the media item recorded by the other computing device;

determine a position of the light source for at least some of the media item frames for obtaining a light transport function;

determine, without using 3D geometry of the media item in the determination, in a first signal domain, the light transport function describing the appearance of a particular media element under different illumination conditions, as produced with a light source, at least partly defined by positions of the light source used to illuminate the particular media element;

sample, in the first signal domain, the light transport function of the particular media element to obtain discrete data samples of the light transport function;

project the data samples, in the first signal domain, into a sampling grid to obtain a spatially sparsely and non-uniformly sampled light transport function;

convert the spatially sparsely and non-uniformly sampled light transport function into a transform signal domain referred to as a second signal domain by using a mathematical operation;

interpolate, in the second signal domain, using compressive sensing, the sparsely and non-uniformly sampled light transport function to obtain a light transport matrix in the second signal domain; and transform the light transport matrix into the first signal domain to obtain a substantially uniformly sampled light transport matrix to produce a relighted media element suitable to be displayed on a display.

16. A method of relighting a media item comprising media elements, the method comprising, for at least some of the media elements:

a first mobile computing device illuminating at least a portion of the media item by a light source of the first mobile computing device;

the first mobile computing device moving along a random trajectory at a varying velocity to thereby illuminate the at least a portion of the media item by the light source;

the first mobile computing device tracking the trajectory;

the first mobile computing device receiving media item frames of the media item recorded by a second computing device;

the first mobile computing device determining a position of the light source for at least some of the media item frames for obtaining a light transport function;

the first mobile computing device determining, without using 3D geometry of the media item in the determination, the light transport function, in a first signal domain, describing the appearance of a particular media element under different illumination conditions at least partly defined by positions of the light source used to illuminate the particular media element;

the first mobile computing device sampling in the first signal domain the light transport function of the particular media element to obtain discrete data samples of the light transport function;

the first mobile computing device projecting the data samples, in the first signal domain, into a sampling grid to obtain a spatially sparsely and non-uniformly sampled light transport function;

the first mobile computing device interpolating in a transform signal domain referred to as a second signal domain, by performing compressive sensing of the sparsely and non-uniformly sampled light transport function to obtain a light transport matrix in the second signal domain; and the first mobile computing device transforming the light transport matrix from the second signal domain into the first signal domain to obtain a substantially uniformly sampled light transport matrix to produce a relighted media item suitable to be displayed on a display.

* * * * *